United States Patent [19]
Jepsen

[11] 3,881,594
[45] May 6, 1975

[54] BELT CONVEYORS
[76] Inventor: Peder Jorgensen Jepsen, Skovparken 3, Hojen, Vejle, Denmark
[22] Filed: Dec. 21, 1972
[21] Appl. No.: 317,300

[52] U.S. Cl. .............................................. 198/204
[51] Int. Cl. .......................................... B65g 15/60
[58] Field of Search ............................ 198/204, 182

[56] References Cited
UNITED STATES PATENTS
3,596,752  8/1971  Garvey ............................... 198/182
3,647,051  3/1972  Didas ................................. 198/204
FOREIGN PATENTS OR APPLICATIONS
957,643  1/1957  Germany ........................... 198/204

Primary Examiner—Evon C. Blunk
Assistant Examiner—Douglas D. Watts
Attorney, Agent, or Firm—Craig & Antonelli

[57] ABSTRACT

A belt conveyor, especially of relatively small cross dimensions such as a bottle conveyor for use in breweries and similar enterprises and comprising a conveyor belt with an upper conveying run and a lower return run, these runs being slidably supported on elongated carrier means of a conveyor chassis having means for holding the carrier means, characterized in that the said holding means comprise a number of crosswise arranged block members mounted in spaced relationship along the conveyor and having the carrier means for the upper run of the conveyor belt mounted adjacent their top side, said block members having a central passage through which the lower return run of the conveyor belt and the carrier means thereof extend. The said block member may be split into block parts along a longitudinal vertical plane both above and below the said central passage whereby they are easy to mount and allow mounting of intermediate block parts enabling a single conveyor to be widened into a conveyor having two or more parallel conveyor belts.

7 Claims, 3 Drawing Figures

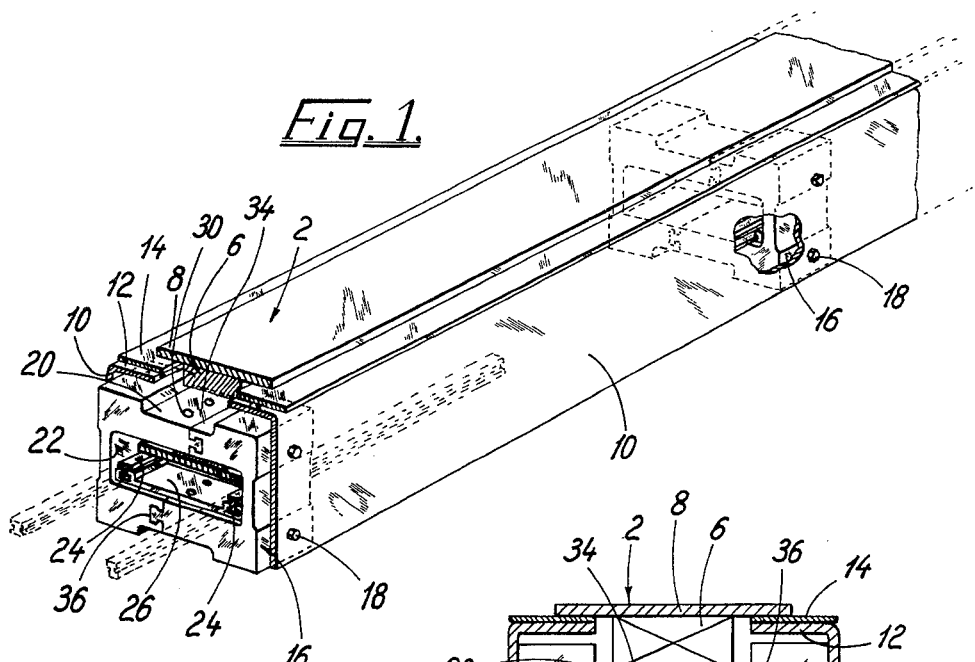

BELT CONVEYORS

The present invention relates to conveyors and more specifically to smaller size conveyors such as bottle conveyors for use in breweries and similar enterprises and comprising a conveyor belt or chain having an upper conveying run and a lower return run, these runs being slidably supported on elongated means of a conveyor chassis having means for holding the carrier means. In such conveyors the carrier means or beams, at spaced points along the conveyor, are held together by suitable mounting structures normally including welded connection elements between the different carrier elements as well as suitable guiding elements for holding the conveyor belt runs in their proper lateral positions. Usually these structures are relatively complicated and require accuracy and skill by the mounting thereof. Another disadvantage is that in case it is desired to broaden a conveyor with one or more additional, parallel conveyors the mounting or holding means shall need a special adaption if the double or multiple conveyor shall not get the character — and the price — of a number of individual conveyors.

It is the purpose of this invention to provide a conveyor in which the said holding means are of simple construction and easy to mount, also in case of a double or multiple conveyor.

According to the invention the said holding means comprise a number of crosswise arranged block members mounted in spaced relationship along the conveyor and having the carrier means for the upper run of the conveyor belt mounted adjacent their top side, said block members having a central passage through which the lower return run of the conveyor belt and the carrier means thereof extend. These blocks are easily produced, e.g. as plastics castings, with such a shape that without particular care by the mounting thereof they will receive or support the carrier means in correct positions; welding work may be avoided with the use of preformed screw holes in the blocks, whereby it is easy to connect the different elements to the blocks. For making a double or multiple conveyor the blocks may be placed side by side and joined e.g. by means of cross bolts extending through passages in the blocks. According to a preferred embodiment of the invention the block members are split into block parts along a longitudinal vertical plane both above and below the central passage, whereas the block parts are fixed to each other in a releasable manner, e.g. by means of a dovetail connection. Thus, the mounting block may be divided into two halves, one at each side of the vertical middle plane of the conveyor, whereby it is easy to assemble around the carrier beams of the lower conveyor run and if it is desired to broaden the conveyor into a double conveyor it will be sufficient to separate the two halves and insert therebetween another block member designed so as to be joinable with these halves not situated at opposite sides of the middle block. Correspondingly, a multiple conveyor may be made by placing several middle blocks between the outer block parts.

These features, by way of example, are illustrated in the accompanying drawing, in which:

FIG. 1 is a perspective view of a portion of a conveyor according to a preferred embodiment of the invention, FIG. 2 is a sectional view of the conveyor shown in FIG. 1, and FIG. 3 is a corresponding sectional view of a multiple conveyor.

The conveyor shown in FIGS. 1 and 2 comprises an endless conveyor belt or chain having an exposed top run 2 and a lower return run 4; the belt runs over sprockets (not shown) at opposite ends of the conveyor. The belt itself may be of any appropriate type, for example comprising a driving belt or chain shown schematically at 6 and a carrier portion 8 shown as a broader belt; the belt may also in known manner be a conveyor chain enabling the conveyor to extend through curves.

Along the conveyor there is arranged a pair of opposed side panels 10 having inwardly directed flange portions 12 adjacent their upper edges. An elongated plate member 14 is secured to the top side of each of these flanges, and these plate or strip members 14 serve to support the underside of the edge portions of the belt 8 as the belt slides therealong.

The panels 10 are at intervals connected to block members 16 by means of crosswise arranged bolts 18 extending through holes in the blocks 16. These blocks are in their top side provided with a recess 20 allowing passage of the chain 6.

Furthermore, the blocks 16 are provided with a central hole or opening 22 through which the return run 4 of the conveyor belt extends, slidably carried on a pair of spaced beams 24 which are in their turn supported on the lower surface of the passage 22 to which they are secured by means of a cross piece 26 made e.g. of plastics and provided at opposite ends with holding recesses 27 for the beams 24, whereas it is fixed to the lower side of the passage 22 by means of a pair of bolts 28 extending through vertical holes 30 in the lower cross portion 32 of the block 16. The corresponding upper cross portion of the block, defining the top limit of the passage 22, is designated 34, and in a preferred embodiment also this portion is provided with vertical holes 30 corresponding to the holes 30 in the lower portion 32.

In both the upper and the lower cross portion 32 and 34, respectively, there is provided a split 36 in the longitudinal direction and preferably having a cross section as shown, i.e. as an interlocking tongue-and-groove connection between the two halves of the block.

Due to these splits 36 the blocks 16 may be assembled around the beams 24 at desired locations therealong without being slipped in from the ends of the beams, since they can be put in from both sides in axially staggered relationship and then be assembled by a relative axial displacement. The beams are secured thereto by means of the bolts 28 and after the joining of the two block halves the side panels 10 may be mounted by means of the bolts 18.

Especially when the blocks or block halves are made by casting it is desirable that the slit 36 in the lower cross portion 32 be laterally off set from the holes 30, as shown. It is also shown that the slit 36 in the upper cross section 34 is off set from the middle plane in the opposite direction; this latter feature is of no direct structural importance as far as the upper cross portion is concerned, but it will be appreciated that with the arrangement shown the two halves of the block are exactly similar, though mounted with opposite orientations, and this involves that only one type of the building elements, viz. the half block element, is required for the formation of all the blocks.

These block halves may also be used as the outer block parts in case of a multiple conveyor as illustrated in FIG. 3. In this case it is sufficient to incorporate a middle block member, generally designated 38, provided with tongue and groove means complementary to those of the outer block parts and designed with a relatively thin vertical middle wall 40 between an upper and lower cross portion matching with the corresponding portions of the outer block parts. As a central support for the two neighbouring tip sections of the conveyor belts a further sliding plate 14 may be mounted on a carrier beam 42 rested on the top side of the middle block 38 and secured thereto by means of vertical bolts (not shown) extending through holes 44 in the middle plane of the member 38. It will be appreciated that also the member 38 may be produced by casting in a suitable material such as a casting metal or artificial material, and that with the cross section shown the member 38 is symmetrical so as to be usable also in upside down position. Otherwise, the construction of the double conveyor is fully analogous to the single conveyor shown in FIGS. 1 and 2, so a more detailed description thereof is not considered necessary.

As shown in phantom line in FIG. 3, a triple conveyor may be made in principally the same manner, the two outer block parts shown in FIG. 3 and two juxtaposed middle block elements 38. Thus, a multiple conveyor of any breadth may be made from only two types of block elements. Hereby these elements may be produced at relatively low costs, and they are easy to assemble in a manner which does not require much skill in order to obtain an accurate construction. Even the building out of an existing single conveyor into a double or multiple conveyor is easily done with the elements according to the invention.

Of course, the invention is not limited to the embodiments shown in the drawing since numerous modifications are possible within the scope of the invention. Thus, when through-going bolts 18 or the like are used for holding the block elements together the tongue-and-groove connections 36 may be avoided and substituted by simple slits, and especially in this case it is also possible to let the slit be situated in the middle plane of the conveyor so as to make the elements more symmetrical. Though it will be most advantageous to produce the block elements as castings the invention also comprises the use of similar elements made form e.g. bent metal strip material or element structures prepared by combined bending and welding or there joining operations. Also the elements may be slit at more than two places when they are just adapted so as to be easily joinable. The elements should not necessarily meet each other in both the upper and the lower cross portion, but of course the rigid connection at both places will improve the stability of the construction.

What is claimed is:

1. A belt conveyor comprising: a conveyor belt with an upper covering run and a lower run return, said runs being slidably supported on elongated carrier means of a conveyor chassis having means for holding the carrier means, said holding means including a plurality of crosswise arranged block members mounted in spaced relationship along the conveyor and having the conveyor means for the upper run of the conveyor belt mounted adjacent their topside, said block members having a central passage through which the lower return run of the conveyor belt and the carrier means thereof extend, said block members being split into block parts along a longitudinal vertical plane above and below the central passage, and means for releasably connecting said block parts to each other, wherein between two of said block parts there is mounted an intermediate block part having portions projecting to both sides of the vertical middle plane so as to form a double block member together with the outer block parts.

2. A conveyor according to claim 1, wherein said releasable connecting means includes a dovetail connection.

3. A conveyor according to claim 1, wherein the said split planes above and below the central passage, respectively, being mutually offset to two opposite sides of the longitudinal, vertical middle plane of the central passage.

4. A belt conveyor comprising: a conveyor belt with an upper conveying run and a lower return run, said runs being slidably supported on elongated carrier means of a conveyor chassis having means for holding the carrier means, said holding means including a plurality of crosswise arranged block members mounted in spaced relationship along the conveyor and having the carrier means for the upper run of the conveyor belt mounted adjacent their top side, said block members having a central passage through which the lower return run of the conveyor belt and the carrier means thereof extend, said block members being split into block parts along a longitudinal vertical plane both above and below the central passage, means for releasably connecting said block parts to each other, an intermediate part being mounted between two of said block parts having portions projecting to both sides of the vertical middle plane thereof so as to form a double block member together with the outer block parts, wherein between the outer block parts there are mounted two or more of the said intermediate block parts thus forming a multiple block member for a number of juxtaposed, parallel conveyors.

5. A belt conveyor comprising: a conveyor belt having an upper conveyor run and a lower conveyor run, elongated carrier means for slidably supporting said upper and lower run, means for holding said carrier means, said holding means being mounted in spaced relationship along the conveyor, each of said holding means including a pair of holding members, and means for releasably connecting said pair of holding members to each other, said holding members defining a passage means for receiving said lower conveyor run and being provided with a means for accommodating said upper conveyor run, each of said holding members being of a substantially U-shaped configuration with the respective leg portions of each of said members being connected by said releasable connecting means, the leg portions of said substantially U-shaped holding members defining the upper and lower limits of said passage means, wherein said connecting means includes a dovetail connection provided between the respective leg portions of said substantially U-shaped holding members.

6. A belt conveyor according to claim 5, wherein said means for accommodating said upper conveyor run includes a recess portion provided in said substantially U-shaped holding members.

7. A belt conveyor according to claim 5, wherein said dovetail connections are mutually offset with respect to a vertically extending plane passing through the longitudinal center of the conveyor belt.

* * * * *